US012719814B2

(12) United States Patent
Zhang et al.

(10) Patent No.: US 12,719,814 B2
(45) Date of Patent: Aug. 25, 2026

(54) NETWORK TRAFFIC FLOW CONTROL METHOD BASED ON DISTRIBUTED STORAGE SYSTEM, ELECTRONIC DEVICE AND STORAGE MEDIUM

(71) Applicant: Beijing Volcano Engine Technology Co., Ltd., Beijing (CN)

(72) Inventors: Shaoyu Zhang, Beijing (CN); Yuhui Chen, Beijing (CN); Yihang Miao, Beijing (CN); Ruidong Cao, Beijing (CN); Tao Wang, Beijing (CN); Liyang Zhao, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 210 days.

(21) Appl. No.: 18/792,546

(22) Filed: Aug. 1, 2024

(65) Prior Publication Data

US 2025/0193130 A1 Jun. 12, 2025

(30) Foreign Application Priority Data

Dec. 11, 2023 (CN) ......................... 202311697074.0

(51) Int. Cl.
*H04L 67/1014* (2022.01)
*H04L 47/80* (2022.01)
*H04L 67/1097* (2022.01)

(52) U.S. Cl.
CPC ........ *H04L 47/805* (2013.01); *H04L 67/1014* (2013.01); *H04L 67/1097* (2013.01)

(58) Field of Classification Search
CPC ............... H04L 47/805; H04L 67/1014; H04L 67/1097; H04L 47/2433; H04L 67/61; H04L 47/782; H04L 67/1095
See application file for complete search history.

(56) References Cited

U.S. PATENT DOCUMENTS 6,046,980 A * 4/2000 Packer .................. H04L 47/263 370/229
11,481,156 B1 * 10/2022 Au ........................ G06F 3/0653
(Continued)

FOREIGN PATENT DOCUMENTS

CN 104104620 A 10/2014
CN 105245469 A 1/2016
(Continued)

OTHER PUBLICATIONS

Notice of registration procedures received from Chinese patent application No. 202311697074.0 mailed on Nov. 6, 2024, 5 pages (1 page English Translation and 4 pages Original Copy).
(Continued)

*Primary Examiner* — Johnny B Aguiar

(57) ABSTRACT

Embodiments of the present disclosure provide a network traffic flow control method and apparatus based on a distributed storage system, an electrical device, and a storage medium. The method includes: acquiring a transmission link for transmitting target data in response to a first data server in the distributed storage system receiving a transmission request for the target data; configuring a first priority parameter for the transmission link by the first data server according to the priority information of the business type to which the target data belongs; and in response to transmitting the target data through the transmission link, configuring a second priority parameter for the target data by the first data server according to the first priority parameter of the transmission link, so as to enable a data transmission device to allocate a network bandwidth to the target data according to the second priority parameter.

17 Claims, 3 Drawing Sheets

(56) References Cited

U.S. PATENT DOCUMENTS

| | | | | |
|---|---|---|---|---|
| 2012/0106342 | A1* | 5/2012 | Sundararajan ........ | H04L 47/193 370/235 |
| 2016/0080207 | A1* | 3/2016 | Prakash ................ | H04L 47/821 370/231 |
| 2018/0048589 | A1* | 2/2018 | Kulkarni ............. | H04L 47/2475 |
| 2019/0124545 | A1 | 4/2019 | Gandhi et al. | |
| 2023/0040411 | A1* | 2/2023 | Mulkar ............... | H04L 47/2441 |

FOREIGN PATENT DOCUMENTS

| | | | |
|---|---|---|---|
| CN | 107196877 | A | 9/2017 |
| CN | 110138610 | A | 8/2019 |
| CN | 113453284 | A | 9/2021 |
| CN | 116016338 | A | 4/2023 |
| CN | 117544577 | B | 12/2024 |
| WO | 2021/254366 | A1 | 12/2021 |

OTHER PUBLICATIONS

Office action received from Chinese patent application No. 202311697074.0 mailed on Jun. 4, 2024, 8 pages (5 pages English Translation and 3 pages Original Copy).

* cited by examiner

NETWORK TRAFFIC FLOW CONTROL METHOD BASED ON DISTRIBUTED STORAGE SYSTEM, ELECTRONIC DEVICE AND STORAGE MEDIUM

This application claims the priority of Chinese Patent Application No. 202311697074.0 filed on Dec. 11, 2023, the disclosure of which is incorporated by reference herein in its entirety as part of the present application.

TECHNICAL FIELD

The embodiments of the present disclosure relate to the technical field of distributed storage, in particular to a network traffic flow control method and apparatus based on a distributed storage system, an electrical device, and a storage medium.

BACKGROUND

The distributed storage system includes multiple data servers. In order to improve the disaster tolerance of the distributed storage system, data is often required to be stored in multiple data servers in the form of multiple copies, which involves data transmission between data servers. However, at the peak of business, the network bandwidth resources between data servers are often tight, which requires reasonable restrictions on the network bandwidth of data transmission.

In related technology, at the peak of business, the IP (Internet Protocol Address) of a client can be obtained first. Then, the priority corresponding to the IP of the client can be obtained. If the priority corresponding to the IP of the client is higher, the network bandwidth between the data servers is increased, and the data corresponding to the IP of the client is preferentially stored.

However, the inventor found that there are at least the following technical problems in the prior art: not all the data of the same client need to be processed urgently, so the accuracy of controlling the traffic flow bandwidth through the priority corresponding to the IP of the client is low.

SUMMARY

The embodiments of the present disclosure provide a network traffic flow control method and apparatus based on a distributed storage system, an electrical device, and a storage medium, to improve the accuracy of controlling the traffic flow bandwidth.

In the first aspect, the embodiments of the present disclosure provide a network traffic flow control method based on a distributed storage system, the method is applied to a distributed storage system, the distributed storage system includes a plurality of data servers; the method includes:

- acquiring a transmission link for transmitting target data in response to a first data server in the distributed storage system receiving a transmission request for the target data, in which the transmission request carries priority information of a business type to which the target data belongs;
- configuring a first priority parameter for the transmission link by the first data server according to the priority information of the business type to which the target data belongs, in which the first priority parameter is used to indicate a priority of the transmission link in a transport layer; and
- in response to transmitting the target data through the transmission link, configuring a second priority parameter for the target data by the first data server according to the first priority parameter of the transmission link, so as to enable a data transmission device to allocate a network bandwidth to the target data according to the second priority parameter, in which the second priority parameter is used to indicate a priority of the target data in a network layer, and the data transmission device is located on the transmission link and used for forwarding the target data transmitted by the transmission link.

In the second aspect, the embodiments of the present disclosure provide a network traffic flow control apparatus based on a distributed storage system, the apparatus is applied to a distributed storage system, the distributed storage system includes a plurality of data servers; the apparatus includes:

- an acquisition module, configured to acquire a transmission link for transmitting target data in response to a first data server in the distributed storage system receiving a transmission request for the target data, in which the transmission request carries priority information of a business type to which the target data belongs;
- a configuration module, configured to configure a first priority parameter for the transmission link by the first data server according to the priority information of the business type to which the target data belongs, in which the first priority parameter is used to indicate a priority of the transmission link in a transport layer; and
- a transmission module, configured to configure a second priority parameter for the target data by the first data server according to the first priority parameter of the transmission link in response to transmitting the target data through the transmission link, so as to enable a data transmission device to allocate a network bandwidth to the target data according to the second priority parameter, in which the second priority parameter is used to indicate a priority of the target data in the network layer, and the data transmission device is located on the transmission link and used for forwarding the target data transmitted by the transmission link.

In the third aspect, the embodiments of the present disclosure provide an electronic device, the electronic device includes a processor and a memory in communication with the processor, the memory stores computer-executable instructions; the processor executes the computer-executable instructions stored in the memory to realize the network traffic flow control method based on a distributed storage system in the first aspect.

In the fourth aspect, the embodiments of the present disclosure provide a computer-readable storage medium, computer-executable instructions are stored in the computer-readable storage medium, and upon a processor executing the computer-executable instructions, the network traffic flow control method based on a distributed storage system in the first aspect is realized.

In the fifth aspect, the embodiments of the present disclosure provide a computer program product, the computer program product includes a computer program, upon the computer program being executed by a processor, the network traffic flow control method based on the distributed storage system in the first aspect is realized.

BRIEF DESCRIPTION OF DRAWINGS

To describe the technical solutions in the embodiments of the present disclosure or in the prior art more clearly, the accompanying drawings required in the description of the embodiments or the prior art will be described briefly below. Apparently, the accompanying drawings in the following description are some embodiments of the present disclosure, other accompanying drawings can also be derived from these drawings by those ordinarily skilled in the art without creative efforts.

DETAILED DESCRIPTION

Figure 1:
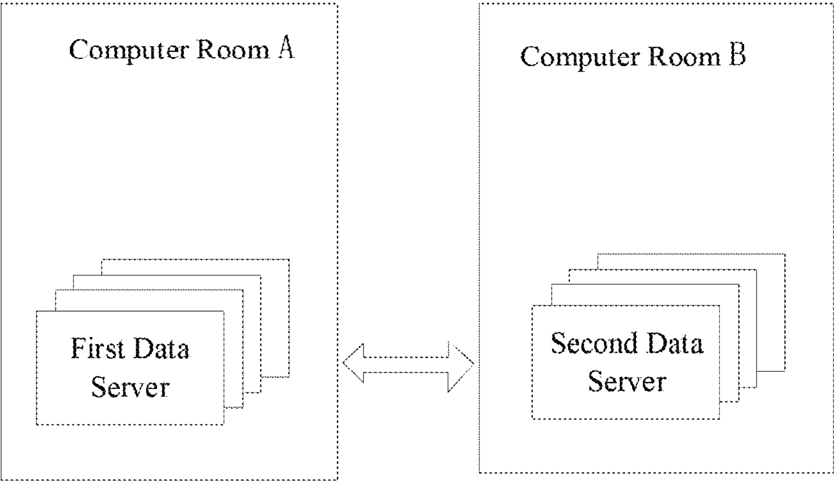
FIG. 1 is a schematic diagram of an application scenario of a network traffic flow control method based on a distributed storage system provided by the embodiments of the present disclosure.

In order to make the purpose, technical solutions and advantages of the embodiments of the present disclosure clearer, the technical solutions in the embodiments of the present disclosure will be described clearly and completely with reference to the attached drawings in the following. Obviously, the described embodiments are a part of the embodiments of the present disclosure, but not the all embodiments. Based on the embodiments in the present disclosure, all other embodiments obtained by ordinary technicians in this field without creative work belong to the protection scope of the present disclosure.

It should be noted that the user information (including but not limited to device information of the user, personal information of the user, etc.) and data (including but not limited to data for analysis, stored data, displayed data, etc.) involved in the present disclosure are all information and data authorized by the user or fully authorized by all parties, and the collection, use and processing of relevant data need to comply with relevant laws, regulations and standards, and corresponding operation portals should be provided for users to choose authorization or rejection.

The distributed storage system includes multiple data servers. In order to improve the disaster tolerance of the distributed storage system, data is often required to be stored in multiple data servers in the form of multiple copies, which involves data transmission between data servers. However, at the peak of business, the network bandwidth resources between data servers are often tight, which requires reasonable restrictions on the network bandwidth of data transmission.

In related technology, at the peak of business, the IP (Internet Protocol Address) of a client can be obtained first. Then, the priority corresponding to the IP of the client can be obtained. If the priority corresponding to the IP of the client is higher, the network bandwidth between the data servers is increased, and the data corresponding to the IP of the client is preferentially stored.

However, not all the data of the same client need to be processed urgently, so the accuracy of controlling the traffic flow bandwidth through the priority corresponding to the IP of the client is low.

It can be seen that how to improve the accuracy of controlling the network bandwidth between data servers is an urgent problem to be solved at present.

In order to solve the above problems, this embodiment provides the following technical ideas: the priority of the business type corresponding to the data is determined first, and the transmission speed of the data is controlled according to the priority of the business type, which realizes limiting the transmission speed of the data with the business type as the dimension and improving the accuracy of controlling the traffic flow bandwidth.

The specific steps of the method may include: firstly, acquiring a transmission link for transmitting target data in response to a first data server in a distributed storage system receiving a transmission request for the target data, in which the transmission request carries priority information of a business type to which the target data belongs; then, configuring a first priority parameter for the transmission link by the first data server according to the priority information of the business type to which the target data belongs, in which the first priority parameter is used to indicate a priority of the transmission link in a transport layer; and finally, configuring a second priority parameter for the target data by the first data server according to the first priority parameter of the transmission link in response to transmitting the target data through the transmission link, so as to enable a data transmission device to allocate a network bandwidth to the target data according to the second priority parameter, in which the second priority parameter is used to indicate a priority of the target data in the network layer.

Here, because the first priority parameter can be configured for different traffic flows according to the priority of the own business of the network traffic flows, and the first priority parameter is converted into the second priority parameter of the network layer during transmitting the data, the switch device can allocate the corresponding network bandwidth for the target data according to the second priority parameter of the network layer, thus realizing the control of the priority of data transmission according to the business type and realizing the finer-grained traffic flow priority control, thus improving the accuracy of controlling the traffic flow bandwidth.

The application scenario of the embodiments of the present disclosure is explained below.

The network traffic flow control method based on the distributed storage system provided by the embodiments of the present disclosure can be applied to a data transmission scenario of the distributed storage system. FIG. 1 is a schematic diagram of an application scenario of a network traffic flow control method based on a distributed storage system provided by the embodiments of the present disclosure. As shown in FIG. 1, the distributed storage system includes a plurality of data servers. The plurality of data servers can be deployed in a plurality of computer rooms. For example, as shown in FIG. 1, a plurality of data servers are deployed in a computer room A and a plurality of data servers are deployed in a computer room B. Upon a first data server in the computer room A needing to write data to a second data server in the computer room B, the transmission speed of the data (that is, the speed of writing data) can be controlled by the network traffic flow control method based on the distributed storage system provided by the embodiments of the present disclosure. Upon the first data server in the computer room A needing to read the data in the second data server in the computer room B, the transmission speed of the data (that is, the data reading speed) can be controlled by the network traffic flow control method based on the distributed storage system provided by the embodiments of the present disclosure. The network traffic flow control method based on the distributed storage system provided by the embodiments of the present disclosure will be described in detail in the following detailed embodiments.

Figure 2:
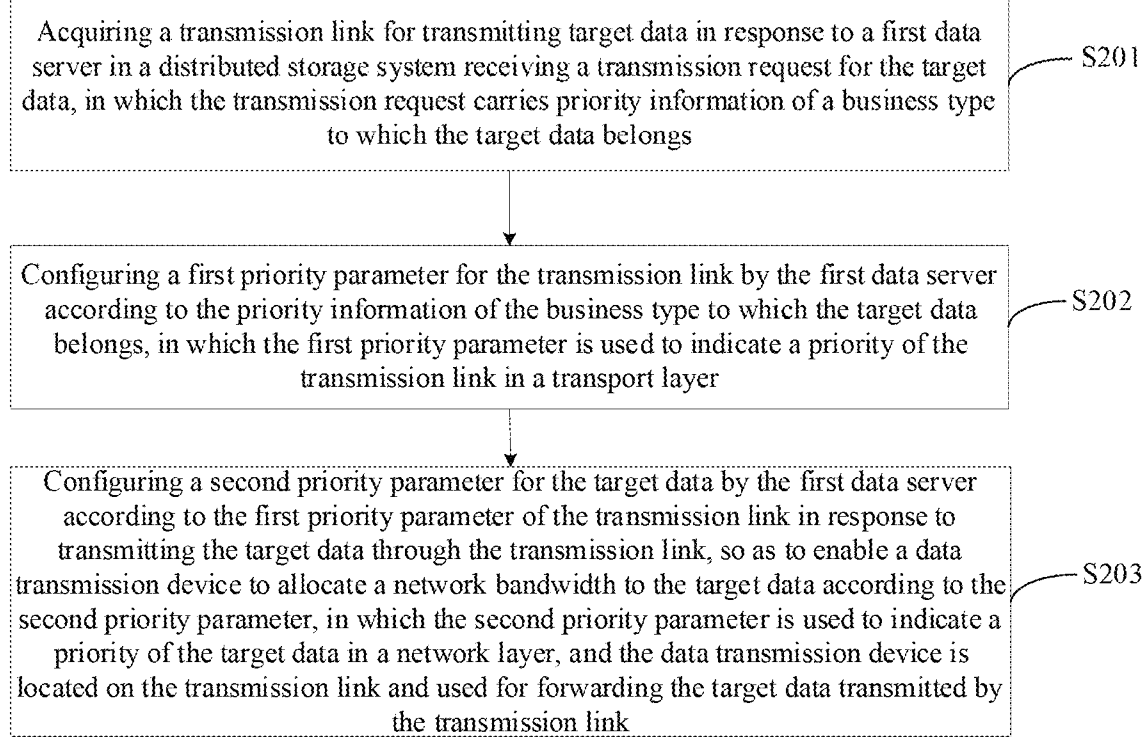
FIG. 2 is a flowchart of a network traffic flow control method based on a distributed storage system provided by the embodiments of the present disclosure.

FIG. 2 is a flowchart of a network traffic flow control method based on a distributed storage system provided by the embodiments of the present disclosure. The network traffic flow control method is applied to a distributed storage system which includes a plurality of data servers. As shown in FIG. 2, the method includes the following steps.

S201. Acquiring a transmission link for transmitting target data in response to a first data server in a distributed storage system receiving a transmission request for the target data, in which the transmission request carries priority information of a business type to which the target data belongs.

In the embodiments of the present disclosure, the business types to which the target data belongs are different, and the priorities of the business types are also different, so that the transmission speed of data of different business types can be controlled according to the priorities of the business types.

Figure 3:
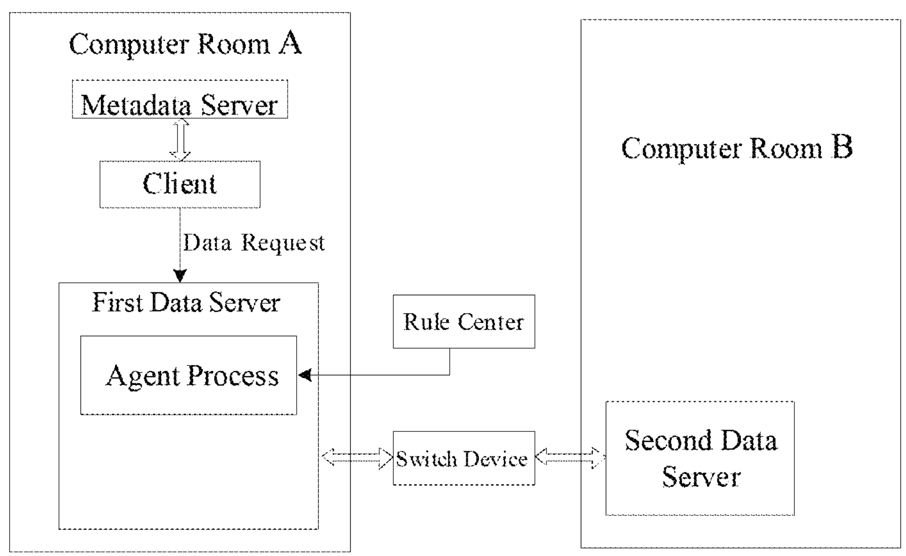
FIG. 3 is a schematic diagram of data writing provided by the embodiments of the present disclosure.

In some embodiments, as shown in FIG. 3, the distributed storage system further includes a client and a metadata server, the client is used to send a transmission request for the target data to the first data server; the metadata server stores a corresponding relationship between a storage directory of business types and priority information.

Accordingly, acquiring the priority information of the business type to which the target data belongs includes: acquiring the priority information of the business type to which the target data belongs from the transmission request for the target data sent from the client through the first data server, in which the transmission request carries the priority information of the business type to which the target data belongs, and the priority information of the business type to which the target data belongs is obtained by the client from the corresponding relationship between the storage directory of the business types and the priority information stored in the metadata server according to the storage directory corresponding to the business type to which the target data belongs.

For example, the data of one business type corresponds to one file target. The data of one business type may be data corresponding to an application, or data corresponding to a certain kind of service (for example, chat service) in an application. A mapping relationship between file targets and priorities may be stored in the metadata server. For example, the priority may be expressed as an integer in a range of 0 to 10; the smaller the value of the priority, the higher the corresponding priority.

For example, the mapping relationship may be stored in a configuration table of the metadata server and loaded into a memory upon the metadata server being started. The mapping relationship may be stored through a hash table.

Figure 4:
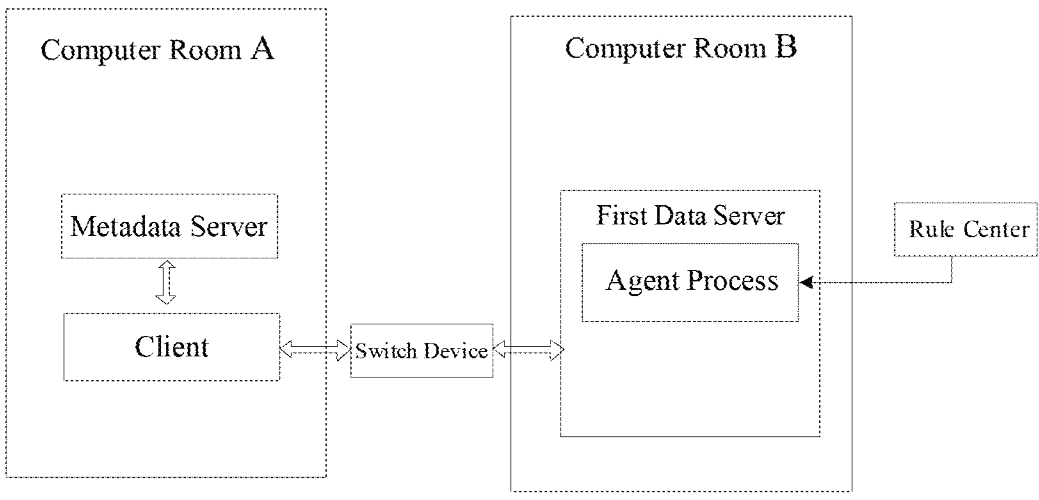
FIG. 4 is a schematic diagram of data reading provided by the embodiments of the present disclosure.

For example, as shown in FIG. 3 and FIG. 4, the priority information of the business type to which the target data belongs can be acquired by the client from the metadata server, and when the client sends a transmission request for the target data to the first data server, the transmission request carries the priority information of the business type to which the target data belongs. It should be noted that in this distributed storage system, the client may be a client located in the computer room or a mobile client. The client can send a transmission request to the first data server.

In the embodiments of the present disclosure, the transmission request for the target data may be a writing request for the target data or a reading request for the target data.

In some embodiments, the transmission request includes a writing request that carries the address information of the second data server to which the target data is to be written; accordingly, acquiring the transmission link for transmitting the target data includes: acquiring the address information of the second data server to which the target data is to be written by the first data server from the writing request; and creating a transmission link (first transmission link) between the first data server and the second data server by the first data server according to the address information of the second data server, in which the transmission link (first transmission link) is used for the first data server to write the target data into the second data server.

For example, as shown in FIG. 3, the transmission request may be a writing request sent by the client to the first data server, and the writing request carries the address information of the second data server to which the target data is to be written, and the first data server may acquire the address information of the second data server from the writing request.

For example, a corresponding relationship between identification information of data servers and address information of the data servers may also be stored in the metadata server. Accordingly, acquiring the address information of the second data server to which the target data is to be written through the client includes: determining the identification information of the second data server to which the target data is to be written through the client, and acquiring the address information of the second data server from the address information respectively corresponding to the plurality of data servers stored in the metadata server according to the identification information of the second data server to which the target data is to be written.

In other embodiments, as shown in FIG. 4, the distributed storage system further includes a client and a metadata server, the client is used to send a reading request for the target data to the first data server; the metadata server stores a corresponding relationship between the identification information of the data servers and the address information of the data servers. Upon the client sending a reading request to the first data server, it is necessary to create a transmission link between the first data server and the client and read the target data on the first data server through the transmission link.

For example, the transmission link between the first data server and the client can be created through the client, and the corresponding steps are as follows: determining identification information of the first data server storing the target data through the client; acquiring address information of the first data server from the corresponding relationship between the identification information of the data servers and the address information of the data servers stored in the metadata server according to the identification information of the first data server; and creating a transmission link between the first data server and the client through the client according to the address information of the first data server.

It should be noted that, as shown in FIG. 4, the priority information of the business type to which the target data belongs may also be obtained from the metadata server through the client. The client sends a reading request for the target data to the first data server, and the reading request may also carry the priority information of the business type to which the target data belongs.

S202. Configuring a first priority parameter for the transmission link by the first data server according to the priority information of the business type to which the target data belongs, in which the first priority parameter is used to indicate a priority of the transmission link in a transport layer.

For example, the first priority parameter is an integer of a preset type. Exemplary, the first priority parameter is the so_mark parameter, and the so_mark parameter is an integer of type uint32_t.

The network authority required to configure the first priority parameter is higher. An independent priority configuration process can be configured in the first data server. In some embodiments, as shown in FIG. 3, a priority configuration process and a data transmission process are installed on the first data server; accordingly, this step includes: executing the data transmission process by the first data server, transmitting the priority information of the business type to which the target data belongs and the transmission link to the priority configuration process, and configuring the first priority parameter for the transmission link according to the priority information of the business type to which the target data belongs by executing the priority configuration process, in which a network authority of the priority configuration process is higher than a network authority of the data transmission process. Illustratively, the priority configuration process is an agent process.

The priority configuration process can configure the first priority parameter for the transmission link by calling a preset priority configuration function. Accordingly, configuring the first priority parameter for the transmission link according to the priority information of the business type to which the target data belongs by executing the priority configuration process includes: calling a preset priority configuration function by executing the priority configuration process; and configuring the first priority parameter for the transmission link according to the priority information of the business type to which the target data belongs through the preset priority configuration function, in which the preset priority configuration function is a setsockopt function, and the first priority parameter is a so_mark parameter.

In the embodiments of the present disclosure, because the network authority required for configuring the so_mark parameter is relatively high, here, an independent priority configuration process (e.g., an agent process) is used to configure the so_mark parameter for the transmission link, and configure the agent process with a relatively high authority mode (e.g., a root mode), and the first data server is allowed to run in a relatively low authority mode, which can reduce the probability of the first data server being attacked by the network.

S203. Configuring a second priority parameter for the target data by the first data server according to the first priority parameter of the transmission link in response to transmitting the target data through the transmission link, so as to enable a data transmission device to allocate a network bandwidth to the target data according to the second priority parameter, in which the second priority parameter is used to indicate a priority of the target data in a network layer, and the data transmission device is located on the transmission link and used for forwarding the target data transmitted by the transmission link.

In the embodiments of the present disclosure, in response to the transmission link successfully configuring the first priority parameter, the target data is transmitted through the transmission link. Exemplary, the first data server receives a response signal that the transmission link successfully configures the first priority parameter, and transmits the target data through the transmission link.

The second priority parameter may be the priority of any network layer. For example, the second priority parameter is a DSCP (Differentiated Services Code Point) parameter.

In some embodiments, the second priority parameter can be configured for the target data through a preset configuration rule. Accordingly, this step includes: acquiring a preset configuration rule through the first data server, in which the preset configuration rule is used for converting the first priority parameter into the second priority parameter; converting the first priority parameter of the transmission link into the second priority parameter by the first data server according to the preset configuration rule; and configuring the second priority parameter for the target data by the first data server.

For example, as shown in FIG. 3, a preset configuration rule is stored in the configuration center, and the first data server can obtain the preset configuration rule from the configuration center through the agent process.

For example, the preset configuration rule may be an iptables rule, a so_mark value (i.e. the first priority parameter) can be converted into a DSCP value (i.e. the second priority parameter) through the iptables rule. Illustratively, the target data is a TCP data packet. Upon the TCP data packet being transmitted through the transmission link, the corresponding DSCP value is filled in for the TCP data packet according to the so_mark value through the iptables rule.

In some embodiments, the data transmission device can allocate the corresponding network bandwidth to the target data according to the DSCP parameter. The data transmission device stores a corresponding relationship between priority parameters and the network bandwidth; accordingly, allocating the network bandwidth to the target data through the data transmission device according to the second priority parameter includes: acquiring a target network bandwidth corresponding to the second priority parameter by the data transmission device from the corresponding relationship between the priority parameters and the network bandwidth stored in the data transmission device according to the second priority parameter; and allocating the target network bandwidth to the target data by the data transmission device.

It should be noted that, as shown in FIG. 3, the plurality of data servers are located in a plurality of computer rooms, and at least one data server of the data servers is deployed in each computer room; the distributed storage system further includes a data transmission device, the data server(s) in one computer room transmits data with the data server(s) in another computer room through the data transmission device. It should be noted that, as shown in FIG. 4, the data server(s) in the computer room can also transmit data with the client through the data transmission device. It should be noted that in the process of writing data by a data server in one computer room, data copies can be stored in the data server(s) in another computer room, in this way, there is data transmission across computer rooms. In the reading process of the data server(s) in a computer room, if data loss occurs, there may also be data transmission across computer rooms.

Compared with the network bandwidth inside the computer room, the network bandwidth across the computer rooms is often tight. At the peak of business, it often happens that the network bandwidth cannot meet all the businesses. It is required to distinguish the priority of business traffic flow, limit the speed of low-priority business data during peak hours, and ensure the network bandwidth of high-priority business data.

The data transmission device is located on the transmission link and is used for forwarding the target data transmitted by the transmission link. For example, in the scenario of writing data, the transmission link is used for the first data server to write the target data to the second data server. The data transmission device is located on the transmission link, receives the target data sent by the first data server, and sends the target data to the second data server, thus realizing the forwarding of the target data transmitted by the transmission link. For another example, in the data reading scenario, the transmission link is used for the client to read the target data from the first data server. The data transmission device is located on the transmission link, receives the target data sent by the first data server, and sends the target data to the client, thus realizing the forwarding of the target data transmitted by the transmission link.

For example, the data transmission device may be a switch device or a network switch device. The data transmission device (for example, a switch device) can limit the speed of different data according to the priority parameters of the data. It should be noted that the higher the priority of the second priority parameter, the larger the allocated target network bandwidth and the faster the data transmission speed. Thus, the data transmission device can allocate the network bandwidth to different business data according to the DSCP value of the business data, that is, the priority of the business data, and the business with higher priority can obtain larger network bandwidth.

For example, as shown in FIG. 3, after allocating the target network bandwidth to the target data, the first data server may write the target data to the second data server through the transmission link according to the target network bandwidth. For example, as shown in FIG. 4, after allocating the target network bandwidth to the target data, the first data server may transmit the target data to the client through the transmission link according to the target network bandwidth.

The network traffic control method based on the distributed storage system provided by the embodiments of the present disclosure includes: acquiring a transmission link for transmitting target data in response to a first data server in a distributed storage system receiving a transmission request for the target data, in which the transmission request carries priority information of a business type to which the target data belongs; configuring a first priority parameter for the transmission link by the first data server according to the priority information of the business type to which the target data belongs, in which the first priority parameter is used to indicate a priority of the transmission link in a transport layer; and configuring a second priority parameter for the target data by the first data server according to the first priority parameter of the transmission link in response to transmitting the target data through the transmission link, so as to enable a data transmission device to allocate a network bandwidth to the target data according to the second priority parameter, in which the second priority parameter is used to indicate a priority of the target data in the network layer, and the data transmission device is located on the transmission link and used for forwarding the target data transmitted by the transmission link. In the embodiments of the present disclosure, because the first priority parameter can be configured for different traffic flows according to the priority of the own business of the network traffic flows, and the first priority parameter is converted into the second priority parameter of the network layer during transmitting the data, in this way, the switch device can allocate the corresponding network bandwidth for the target data according to the second priority parameter of the network layer, thus realizing the control of the priority of data transmission according to the business type and realizing the finer-grained traffic flow priority control, thus improving the accuracy of controlling the traffic flow bandwidth.

Figure 5:
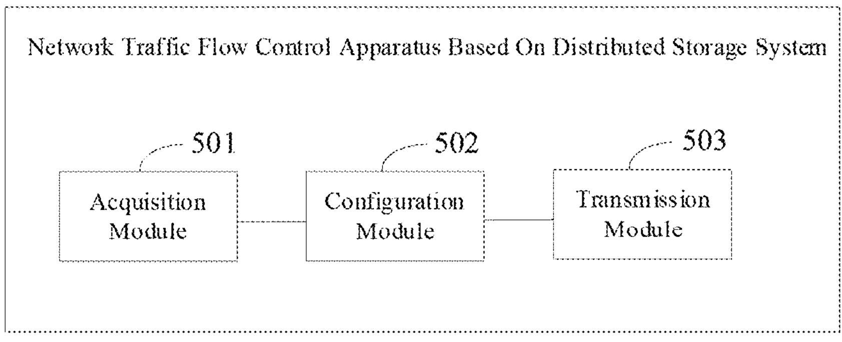
FIG. 5 is a structure block diagram of a network flow control apparatus based on a distributed storage system provided by the embodiments of the present disclosure.

FIG. 5 is a structure block diagram of a network flow control apparatus based on a distributed storage system provided by the embodiments of the present disclosure; the network flow control apparatus is applied to a distributed storage system, the distributed storage system includes a plurality of data servers; and referring to FIG. 5, the apparatus includes: an acquisition module 501, a configuration module 502, and a transmission module 503.

The acquisition module 501 is configured to acquire a transmission link for transmitting target data in response to a first data server in the distributed storage system receiving a transmission request for the target data, in which the transmission request carries priority information of a business type to which the target data belongs.

The configuration module 502 is configured to configure a first priority parameter for the transmission link by the first data server according to the priority information of the business type to which the target data belongs, in which the first priority parameter is used to indicate a priority of the transmission link in a transport layer.

The transmission module 503 is configured to configure a second priority parameter for the target data by the first data server according to the first priority parameter of the transmission link in response to transmitting the target data through the transmission link, so as to enable a data transmission device to allocate a network bandwidth to the target data according to the second priority parameter, in which the second priority parameter is used to indicate a priority of the target data in the network layer, and the data transmission device is located on the transmission link and used for forwarding the target data transmitted by the transmission link.

According to one or more embodiments of the present disclosure, the distributed storage system further includes a client and a metadata server, the client is used for sending the transmission request for the target data to the first data server; the metadata server stores a corresponding relationship between a storage directory of business types and priority information; correspondingly, the configuration module 502 is further configured to acquire the priority information of the business type to which the target data belongs by the first data server from the transmission request for the target data sent from the client, in which the transmission request carries the priority information of the business type to which the target data belongs, the priority information of the business type to which the target data belongs is obtained by the client from the corresponding relationship between the storage directory of the business types and the priority information stored in the metadata server according to a storage directory corresponding to the business type to which the target data belongs.

According to one or more embodiments of the present disclosure, a priority configuration process and a data transmission process are installed on the first data server; correspondingly, the configuration module 502, configured to configure a first priority parameter for the transmission link by the first data server according to the priority information of the business type to which the target data belongs, is specifically configured to: execute the data transmission process by the first data server, transmit the priority information of the business type to which the target data belongs and the transmission link to the priority configuration process, and configure the first priority parameter for the transmission link according to the priority information of the business type to which the target data belongs by executing the priority configuration process, in which a network authority of the priority configuration process is higher than a network authority of the data transmission process.

According to one or more embodiments of the present disclosure, the configuration module 502, configured to configure the first priority parameter for the transmission link according to the priority information of the business type to which the target data belongs by executing the priority configuration process, is specifically configured to: call a preset priority configuration function by executing the priority configuration process; and configure the first priority parameter for the transmission link according to the priority information of the business type to which the target data belongs through the preset priority configuration function, in which the preset priority configuration function is a setsockopt function, and the first priority parameter is a so_mark parameter.

According to one or more embodiments of the present disclosure, the configuration module 502, configured to configure a second priority parameter for the target data by the first data server according to the first priority parameter of the transmission link, is specifically configured to: acquire a preset configuration rule through the first data server, in which the preset configuration rule is used for converting the first priority parameter into the second priority parameter; convert the first priority parameter of the transmission link into the second priority parameter by the first data server according to the preset configuration rule; and configure the second priority parameter for the target data by the first data server.

According to one or more embodiments of the present disclosure, the transmission request includes a writing request, and the writing request carries address information of a second data server to which the target data is to be written; accordingly, the acquisition module 501, configured to acquire a transmission link for transmitting target data, is specifically configured to: acquire the address information of the second data server to which the target data is to be written by the first data server from the writing request; and create a first transmission link between the first data server and the second data server by the first data server according to the address information of the second data server, in which the first transmission link is used for the first data server to transmit the target data to the second data server.

According to one or more embodiments of the present disclosure, the distributed storage system further includes a client and a metadata server, the client is used for sending a reading request for the target data to the first data server; the metadata server stores a corresponding relationship between identification information of data servers and address information of the data servers; accordingly, the acquisition module 501, configured to acquire a transmission link for transmitting target data, is specifically configured to: determine identification information of the first data server storing the target data through the client; acquire address information of the first data server from the corresponding relationship between the identification information of the data servers and the address information of the data servers stored in the metadata server according to the identification information of the first data server; and create a second transmission link between the first data server and the client through the client according to the address information of the first data server, in which the second transmission link is used for the first data server to transmit the target data to the client.

According to one or more embodiments of the present disclosure, the plurality of data servers are located in a plurality of computer rooms, and at least one data server of the data servers is deployed in each of the computer rooms; the distributed storage system further includes a data transmission device, the at least one data server in one of the computer rooms transmits data with the at least one data server in another computer room through the data transmission device.

According to one or more embodiments of the present disclosure, the data transmission device stores a corresponding relationship between priority parameters and a network bandwidth; accordingly, the transmission module 503, configured to allocate the network bandwidth to the target data by the data transmission device according to the second priority parameter, is specifically configured to: acquire a target network bandwidth corresponding to the second priority parameter by the data transmission device from the corresponding relationship between the priority parameters and the network bandwidth stored in the data transmission device according to the second priority parameter; and allocate the target network bandwidth to the target data by the data transmission device.

The acquisition module 501, the configuration module 502, and the transmission module 503 are sequentially connected. The network traffic control apparatus based on a distributed storage system provided by the embodiments of the present disclosure can execute the technical solutions of the above method embodiments, and its implementation principle and technical effect are similar, which will not be repeated here.

Figure 6:
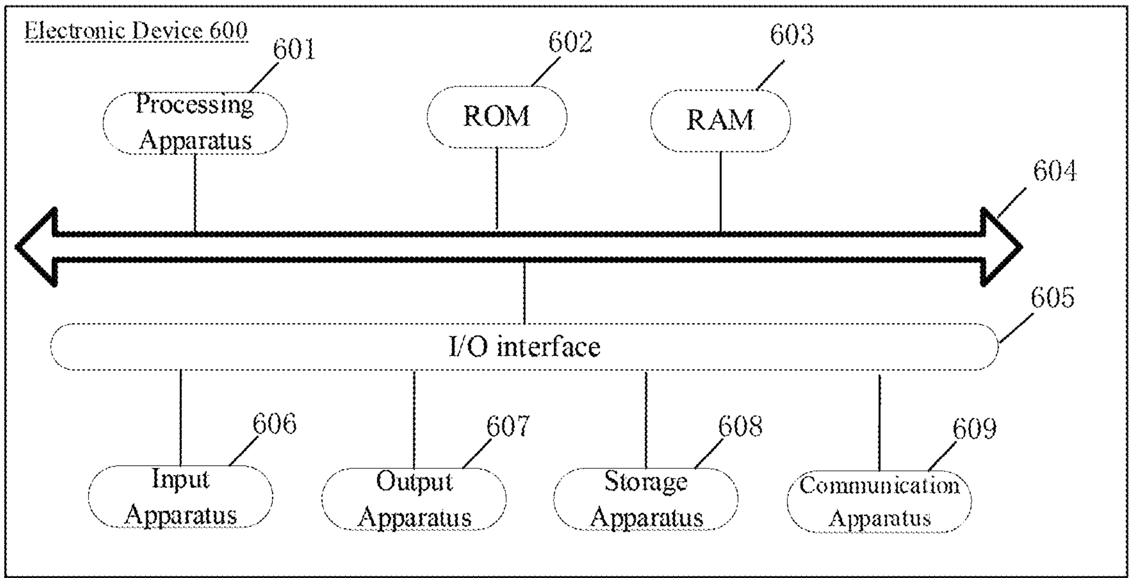
FIG. 6 is a schematic diagram of a hardware structure of an electronic device provided by the embodiments of the present disclosure.

FIG. 6 is a schematic diagram of a hardware structure of an electronic device provided by the embodiments of the present disclosure. Referring to FIG. 6, the electronic device may be a terminal device or a server. The terminal device may include but is not limited to a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and a fixed terminal such as a digital TV, a desktop computer, or the like. The electronic device illustrated in FIG. 6 is merely an example, and should not pose any limitation to the functions and the range of use of the embodiments of the present disclosure.

As shown in FIG. 6, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to execute the method in the above embodiments.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquisition unit may also be described as "a unit that acquires at least two Internet protocol addresses".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In the first aspect, according to one or more embodiments of the present disclosure, a network traffic flow control method based on a distributed storage system is provided, the method is applied to a distributed storage system, the distributed storage system includes a plurality of data servers; the method includes:

acquiring a transmission link for transmitting target data in response to a first data server in the distributed storage system receiving a transmission request for the target data, in which the transmission request carries priority information of a business type to which the target data belongs;

configuring a first priority parameter for the transmission link by the first data server according to the priority information of the business type to which the target data belongs, in which the first priority parameter is used to indicate a priority of the transmission link in a transport layer; and in response to transmitting the target data through the transmission link, configuring a second priority parameter for the target data by the first data server according to the first priority parameter of the transmission link, so as to enable a data transmission device to allocate a network bandwidth to the target data according to the second priority parameter, in which the second priority parameter is used to indicate a priority of the target data in a network layer, and the data transmission device is located on the transmission link and used for forwarding the target data transmitted by the transmission link.

According to one or more embodiments of the present disclosure, the distributed storage system further includes a client and a metadata server, the client is used for sending the transmission request for the target data to the first data server; the metadata server stores a corresponding relationship between a storage directory of business types and priority information; correspondingly, before the configuring a first priority parameter for the transmission link by the first data server according to the priority information of the business type to which the target data belongs, the method further includes: acquiring the priority information of the business type to which the target data belongs by the first data server from the transmission request for the target data sent from the client, in which the transmission request carries the priority information of the business type to which the target data belongs, the priority information of the business type to which the target data belongs is obtained by the client from the corresponding relationship between the storage directory of the business types and the priority information stored in the metadata server according to a storage directory corresponding to the business type to which the target data belongs.

According to one or more embodiments of the present disclosure, a priority configuration process and a data transmission process are installed on the first data server; correspondingly, the configuring a first priority parameter for the transmission link by the first data server according to the priority information of the business type to which the target data belongs includes: executing the data transmission process by the first data server, transmitting the priority information of the business type to which the target data belongs and the transmission link to the priority configuration process, and configuring the first priority parameter for the transmission link according to the priority information of the business type to which the target data belongs by executing the priority configuration process, in which a network authority of the priority configuration process is higher than a network authority of the data transmission process.

According to one or more embodiments of the present disclosure, the configuring the first priority parameter for the transmission link according to the priority information of the business type to which the target data belongs by executing the priority configuration process includes: calling a preset priority configuration function by executing the priority configuration process; and configuring the first priority parameter for the transmission link according to the priority information of the business type to which the target data belongs through the preset priority configuration function, in which the preset priority configuration function is a setsockopt function, and the first priority parameter is a so_mark parameter.

According to one or more embodiments of the present disclosure, the configuring a second priority parameter for the target data by the first data server according to the first priority parameter of the transmission link includes: acquiring a preset configuration rule through the first data server, in which the preset configuration rule is used for converting the first priority parameter into the second priority parameter; converting the first priority parameter of the transmission link into the second priority parameter by the first data server according to the preset configuration rule; and configuring the second priority parameter for the target data by the first data server.

According to one or more embodiments of the present disclosure, the transmission request includes a writing request, and the writing request carries address information of a second data server to which the target data is to be written; accordingly, the acquiring a transmission link for transmitting target data includes: acquiring the address information of the second data server to which the target data is to be written by the first data server from the writing request; and creating a first transmission link between the first data server and the second data server by the first data server according to the address information of the second data server, in which the first transmission link is used for the first data server to transmit the target data to the second data server.

According to one or more embodiments of the present disclosure, the distributed storage system further includes a client and a metadata server, the client is used for sending a reading request for the target data to the first data server; the metadata server stores a corresponding relationship between identification information of data servers and address information of the data servers; accordingly, the acquiring a transmission link for transmitting target data includes: determining identification information of the first data server storing the target data through the client; acquiring address information of the first data server from the corresponding relationship between the identification information of the data servers and the address information of the data servers stored in the metadata server according to the identification information of the first data server; and creating a second transmission link between the first data server and the client through the client according to the address information of the first data server, in which the second transmission link is used for the first data server to transmit the target data to the client.

According to one or more embodiments of the present disclosure, the plurality of data servers are located in a plurality of computer rooms, and at least one data server of the data servers is deployed in each of the computer rooms; the distributed storage system further includes a data transmission device, in which the at least one data server in one of the computer rooms transmits data with the at least one data server in another computer room through the data transmission device.

According to one or more embodiments of the present disclosure, the data transmission device stores a corresponding relationship between priority parameters and a network bandwidth; accordingly, the allocating the network bandwidth to the target data by the data transmission device according to the second priority parameter includes: acquiring a target network bandwidth corresponding to the second priority parameter by the data transmission device from the corresponding relationship between the priority parameters and the network bandwidth stored in the data transmission device according to the second priority parameter; and allocating the target network bandwidth to the target data by the data transmission device.

In the second aspect, according to one or more embodiments of the present disclosure, a network traffic flow control apparatus based on a distributed storage system is provided, the apparatus is applied to a distributed storage system, the distributed storage system includes a plurality of data servers; the apparatus includes:

- an acquisition module, configured to acquire a transmission link for transmitting target data in response to a first data server in the distributed storage system receiving a transmission request for the target data, in which the transmission request carries priority information of a business type to which the target data belongs;
- a configuration module, configured to configure a first priority parameter for the transmission link by the first data server according to the priority information of the business type to which the target data belongs, in which the first priority parameter is used to indicate a priority of the transmission link in a transport layer; and
- a transmission module, configured to configure a second priority parameter for the target data by the first data server according to the first priority parameter of the transmission link in response to transmitting the target data through the transmission link, so as to enable a data transmission device to allocate a network bandwidth to the target data according to the second priority parameter, in which the second priority parameter is used to indicate a priority of the target data in the network layer, and the data transmission device is located on the transmission link and used for forwarding the target data transmitted by the transmission link.

According to one or more embodiments of the present disclosure, the distributed storage system further includes a client and a metadata server, the client is used for sending the transmission request for the target data to the first data server; the metadata server stores a corresponding relationship between a storage directory of business types and priority information; correspondingly, the configuration module is further configured to acquire the priority information of the business type to which the target data belongs by the first data server from the transmission request for the target data sent from the client, in which the transmission request carries the priority information of the business type to which the target data belongs, the priority information of the business type to which the target data belongs is obtained by the client from the corresponding relationship between the storage directory of the business types and the priority information stored in the metadata server according to a storage directory corresponding to the business type to which the target data belongs.

According to one or more embodiments of the present disclosure, a priority configuration process and a data transmission process are installed on the first data server; correspondingly, the configuration module, configured to configure a first priority parameter for the transmission link by the first data server according to the priority information of the business type to which the target data belongs, is specifically configured to: execute the data transmission process by the first data server, transmit the priority information of the business type to which the target data belongs and the transmission link to the priority configuration process, and configure the first priority parameter for the transmission link according to the priority information of the business type to which the target data belongs by executing the priority configuration process, in which a network authority of the priority configuration process is higher than a network authority of the data transmission process.

According to one or more embodiments of the present disclosure, the configuration module, configured to configure the first priority parameter for the transmission link according to the priority information of the business type to which the target data belongs by executing the priority configuration process, is specifically configured to: call a preset priority configuration function by executing the priority configuration process; and configure the first priority parameter for the transmission link according to the priority information of the business type to which the target data belongs through the preset priority configuration function, in which the preset priority configuration function is a setsockopt function, and the first priority parameter is a so_mark parameter.

According to one or more embodiments of the present disclosure, the configuration module, configured to configure a second priority parameter for the target data by the first data server according to the first priority parameter of the transmission link, is specifically configured to: acquire a preset configuration rule through the first data server, in which the preset configuration rule is used for converting the first priority parameter into the second priority parameter; convert the first priority parameter of the transmission link into the second priority parameter by the first data server according to the preset configuration rule; and configure the second priority parameter for the target data by the first data server.

According to one or more embodiments of the present disclosure, the transmission request includes a writing request, and the writing request carries address information of a second data server to which the target data is to be written; accordingly, the acquisition module, configured to acquire a transmission link for transmitting target data, is specifically configured to: acquire the address information of the second data server to which the target data is to be written by the first data server from the writing request; and create a first transmission link between the first data server and the second data server by the first data server according to the address information of the second data server, in which the first transmission link is used for the first data server to transmit the target data to the second data server.

According to one or more embodiments of the present disclosure, the distributed storage system further includes a client and a metadata server, the client is used for sending a reading request for the target data to the first data server; the metadata server stores a corresponding relationship between identification information of data servers and address information of the data servers; accordingly, the acquisition module, configured to acquire a transmission link for transmitting target data, is specifically configured to: determine identification information of the first data server storing the target data through the client; acquire address information of the first data server from the corresponding relationship between the identification information of the data servers and the address information of the data servers stored in the metadata server according to the identification information of the first data server; and create a second transmission link between the first data server and the client through the client according to the address information of the first data server, in which the second transmission link is used for the first data server to transmit the target data to the client.

According to one or more embodiments of the present disclosure, the plurality of data servers are located in a plurality of computer rooms, and at least one data server of the data servers is deployed in each of the computer rooms; the distributed storage system further includes a data transmission device, the at least one data server in one of the computer rooms transmits data with the at least one data server in another computer room through the data transmission device.

According to one or more embodiments of the present disclosure, the data transmission device stores a corresponding relationship between priority parameters and a network bandwidth; accordingly, the transmission module, configured to allocate the network bandwidth to the target data by the data transmission device according to the second priority parameter, is specifically configured to: acquire a target network bandwidth corresponding to the second priority parameter by the data transmission device from the corresponding relationship between the priority parameters and the network bandwidth stored in the data transmission device according to the second priority parameter; and allocate the target network bandwidth to the target data by the data transmission device.

In the third aspect, according to one or more embodiments of the present disclosure, an electronic device is provided, the electronic device includes a processor and a memory in communication with the processor, the memory stores computer-executable instructions; the processor executes the computer-executable instructions stored in the memory to realize the network traffic flow control method based on a distributed storage system in any embodiment in the first aspect.

In the fourth aspect, according to one or more embodiments of the present disclosure, a computer-readable storage medium is provided, computer-executable instructions are stored in the computer-readable storage medium, and upon a processor executing the computer-executable instructions, the network traffic flow control method based on a distributed storage system in any embodiment in the first aspect is realized.

In the fifth aspect, according to one or more embodiments of the present disclosure, a computer program product is provided, the computer program product includes a computer program, upon the computer program being executed by a processor, the network traffic flow control method based on the distributed storage system in any embodiment in the first aspect is realized.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A network traffic flow control method based on a distributed storage system, being applied to the distributed storage system, wherein the distributed storage system comprises a plurality of data servers; the method comprises:

acquiring a transmission link for transmitting target data in response to a first data server in the distributed storage system receiving a transmission request for the target data, wherein the transmission request carries priority information of a business type to which the target data belongs;

configuring a first priority parameter for the transmission link by the first data server according to the priority information of the business type to which the target data belongs, wherein the first priority parameter is used to indicate a priority of the transmission link in a transport layer; and in response to transmitting the target data through the transmission link, configuring a second priority parameter for the target data by the first data server according to the first priority parameter of the transmission link, and allocating, by a data transmission device, a network bandwidth to the target data according to the second priority parameter, wherein the second priority parameter is used to indicate a priority of the target data in a network layer, and the data transmission device is located on the transmission link and used for forwarding the target data transmitted by the transmission link, wherein the configuring the second priority parameter for the target data by the first data server according to the first priority parameter of the transmission link comprises:

acquiring a preset configuration rule through the first data server, wherein the preset configuration rule is used for converting the first priority parameter into the second priority parameter;

converting the first priority parameter of the transmission link into the second priority parameter by the first data server according to the preset configuration rule; and configuring the second priority parameter for the target data by the first data server.

2. The method according to claim 1, wherein the distributed storage system further comprises a client and a metadata server, wherein the client is used for sending the transmission request for the target data to the first data server; the metadata server stores a corresponding relationship between a storage directory of business types and priority information;

before the configuring a first priority parameter for the transmission link by the first data server according to the priority information of the business type to which the target data belongs, the method further comprises:

acquiring the priority information of the business type to which the target data belongs by the first data server from the transmission request for the target data sent from the client, wherein the transmission request carries the priority information of the business type to which the target data belongs, wherein the priority information of the business type to which the target data belongs is obtained by the client from the corresponding relationship between the storage directory of the business types and the priority information stored in the metadata server according to a storage directory corresponding to the business type to which the target data belongs.

3. The method according to claim 1, wherein a priority configuration process and a data transmission process are installed on the first data server;

the configuring a first priority parameter for the transmission link by the first data server according to the priority information of the business type to which the target data belongs comprises:

executing the data transmission process by the first data server, transmitting the priority information of the business type to which the target data belongs and the transmission link to the priority configuration process, and configuring the first priority parameter for the transmission link according to the priority information of the business type to which the target data belongs by executing the priority configuration process, wherein a network authority of the priority configuration process is higher than a network authority of the data transmission process.

4. The method according to claim 3, wherein the configuring the first priority parameter for the transmission link according to the priority information of the business type to which the target data belongs by executing the priority configuration process comprises:

calling a preset priority configuration function by executing the priority configuration process; and configuring the first priority parameter for the transmission link according to the priority information of the business type to which the target data belongs through the preset priority configuration function, wherein the preset priority configuration function is a setsockopt function, and the first priority parameter is a so_mark parameter.

5. The method according to claim 1, wherein the transmission request comprises a writing request, and the writing request carries address information of a second data server to which the target data is to be written;

the acquiring a transmission link for transmitting target data comprises:

acquiring the address information of the second data server to which the target data is to be written by the first data server from the writing request; and creating a first transmission link between the first data server and the second data server by the first data server according to the address information of the second data server, wherein the first transmission link is used for the first data server to transmit the target data to the second data server.

6. The method according to claim 1, wherein the distributed storage system further comprises a client and a metadata server, the client is used for sending a reading request for the target data to the first data server; the metadata server stores a corresponding relationship between identification information of data servers and address information of the data servers;

the acquiring a transmission link for transmitting target data comprises:

determining identification information of the first data server storing the target data through the client;

acquiring address information of the first data server from the corresponding relationship between the identification information of the data servers and the address information of the data servers stored in the metadata server according to the identification information of the first data server; and creating a second transmission link between the first data server and the client through the client according to the address information of the first data server, wherein the second transmission link is used for the first data server to transmit the target data to the client.

7. The method according to claim 1, wherein the plurality of data servers are located in a plurality of computer rooms, and at least one data server of the data servers is deployed in each of the computer rooms; the distributed storage system further comprises a data transmission device, wherein the at least one data server in one of the computer rooms transmits data with the at least one data server in another computer room through the data transmission device.

8. The method according to claim 1, wherein the data transmission device stores a corresponding relationship between priority parameters and a network bandwidth;

the allocating the network bandwidth to the target data by the data transmission device according to the second priority parameter comprises:

acquiring a target network bandwidth corresponding to the second priority parameter by the data transmission device from the corresponding relationship between the priority parameters and the network bandwidth stored in the data transmission device according to the second priority parameter; and allocating the target network bandwidth to the target data by the data transmission device.

9. An electronic device, comprising: a processor and a memory in communication with the processor, wherein the memory stores computer-executable instructions;

the processor executes the computer-executable instructions stored in the memory to realize a network traffic flow control method based on a distributed storage system, wherein the method comprises:

acquiring a transmission link for transmitting target data in response to a first data server in the distributed storage system receiving a transmission request for the target data, wherein the transmission request carries priority information of a business type to which the target data belongs;

configuring a first priority parameter for the transmission link by the first data server according to the priority information of the business type to which the target data belongs, wherein the first priority parameter is used to indicate a priority of the transmission link in a transport layer; and in response to transmitting the target data through the transmission link, configuring a second priority parameter for the target data by the first data server according to the first priority parameter of the transmission link, and allocating, by a data transmission device, a network bandwidth to the target data according to the second priority parameter, wherein the second priority parameter is used to indicate a priority of the target data in a network layer, and the data transmission device is located on the transmission link and used for forwarding the target data transmitted by the transmission link, wherein the configuring the second priority parameter for the target data by the first data server according to the first priority parameter of the transmission link comprises:

acquiring a preset configuration rule through the first data server, wherein the preset configuration rule is used for converting the first priority parameter into the second priority parameter;

converting the first priority parameter of the transmission link into the second priority parameter by the first data server according to the preset configuration rule; and configuring the second priority parameter for the target data by the first data server.

10. The device according to claim 9, wherein the distributed storage system further comprises a client and a metadata server, wherein the client is used for sending the transmission request for the target data to the first data server; the metadata server stores a corresponding relationship between a storage directory of business types and priority information;

before the configuring a first priority parameter for the transmission link by the first data server according to the priority information of the business type to which the target data belongs, the method further comprises:

acquiring the priority information of the business type to which the target data belongs by the first data server from the transmission request for the target data sent from the client, wherein the transmission request carries the priority information of the business type to which the target data belongs, wherein the priority information of the business type to which the target data belongs is obtained by the client from the corresponding relationship between the storage directory of the business types and the priority information stored in the metadata server according to a storage directory corresponding to the business type to which the target data belongs.

11. The device according to claim 9, wherein a priority configuration process and a data transmission process are installed on the first data server;

the configuring a first priority parameter for the transmission link by the first data server according to the priority information of the business type to which the target data belongs comprises:

executing the data transmission process by the first data server, transmitting the priority information of the business type to which the target data belongs and the transmission link to the priority configuration process, and configuring the first priority parameter for the transmission link according to the priority information of the business type to which the target data belongs by executing the priority configuration process, wherein a network authority of the priority configuration process is higher than a network authority of the data transmission process.

12. The device according to claim 11, wherein the configuring the first priority parameter for the transmission link according to the priority information of the business type to which the target data belongs by executing the priority configuration process comprises:

calling a preset priority configuration function by executing the priority configuration process; and configuring the first priority parameter for the transmission link according to the priority information of the business type to which the target data belongs through the preset priority configuration function, wherein the preset priority configuration function is a setsockopt function, and the first priority parameter is a so_mark parameter.

13. The device according to claim 9, wherein the transmission request comprises a writing request, and the writing request carries address information of a second data server to which the target data is to be written;

the acquiring a transmission link for transmitting target data comprises:

acquiring the address information of the second data server to which the target data is to be written by the first data server from the writing request; and creating a first transmission link between the first data server and the second data server by the first data server according to the address information of the second data server, wherein the first transmission link is used for the first data server to transmit the target data to the second data server.

14. The device according to claim 9, wherein the distributed storage system further comprises a client and a metadata server, the client is used for sending a reading request for the target data to the first data server; the metadata server stores a corresponding relationship between identification information of data servers and address information of the data servers;

the acquiring a transmission link for transmitting target data comprises:

determining identification information of the first data server storing the target data through the client;

acquiring address information of the first data server from the corresponding relationship between the identification information of the data servers and the address information of the data servers stored in the metadata server according to the identification information of the first data server; and creating a second transmission link between the first data server and the client through the client according to the address information of the first data server, wherein the second transmission link is used for the first data server to transmit the target data to the client.

15. The device according to claim 9, wherein the plurality of data servers are located in a plurality of computer rooms, and at least one data server of the data servers is deployed in each of the computer rooms; the distributed storage system further comprises a data transmission device, wherein the at least one data server in one of the computer rooms transmits data with the at least one data server in another computer room through the data transmission device.

16. The device according to claim 9, wherein the data transmission device stores a corresponding relationship between priority parameters and a network bandwidth;

the allocating the network bandwidth to the target data by the data transmission device according to the second priority parameter comprises:

acquiring a target network bandwidth corresponding to the second priority parameter by the data transmission device from the corresponding relationship between the priority parameters and the network bandwidth stored in the data transmission device according to the second priority parameter; and allocating the target network bandwidth to the target data by the data transmission device.

17. A non-transitory computer-readable storage medium, wherein computer-executable instructions are stored in the computer-readable storage medium, and upon a processor executing the computer-executable instructions, a network traffic flow control method based on a distributed storage system is realized, the method comprises:

acquiring a transmission link for transmitting target data in response to a first data server in the distributed storage system receiving a transmission request for the target data, wherein the transmission request carries priority information of a business type to which the target data belongs;

configuring a first priority parameter for the transmission link by the first data server according to the priority information of the business type to which the target data belongs, wherein the first priority parameter is used to indicate a priority of the transmission link in a transport layer; and in response to transmitting the target data through the transmission link, configuring a second priority parameter for the target data by the first data server according to the first priority parameter of the transmission link, and allocating, by a data transmission device, a network bandwidth to the target data according to the second priority parameter, wherein the second priority parameter is used to indicate a priority of the target data in a network layer, and the data transmission device is located on the transmission link and used for forwarding the target data transmitted by the transmission link, wherein the configuring the second priority parameter for the target data by the first data server according to the first priority parameter of the transmission link comprises:

acquiring a preset configuration rule through the first data server, wherein the preset configuration rule is used for converting the first priority parameter into the second priority parameter;

converting the first priority parameter of the transmission link into the second priority parameter by the first data server according to the preset configuration rule; and configuring the second priority parameter for the target data by the first data server.

* * * * *